R. FÜRSTENAU.
MEASURING INSTRUMENT FOR RÖNTGEN RAYS.
APPLICATION FILED JAN. 28, 1914.
1,229,740.
Patented June 12, 1917.
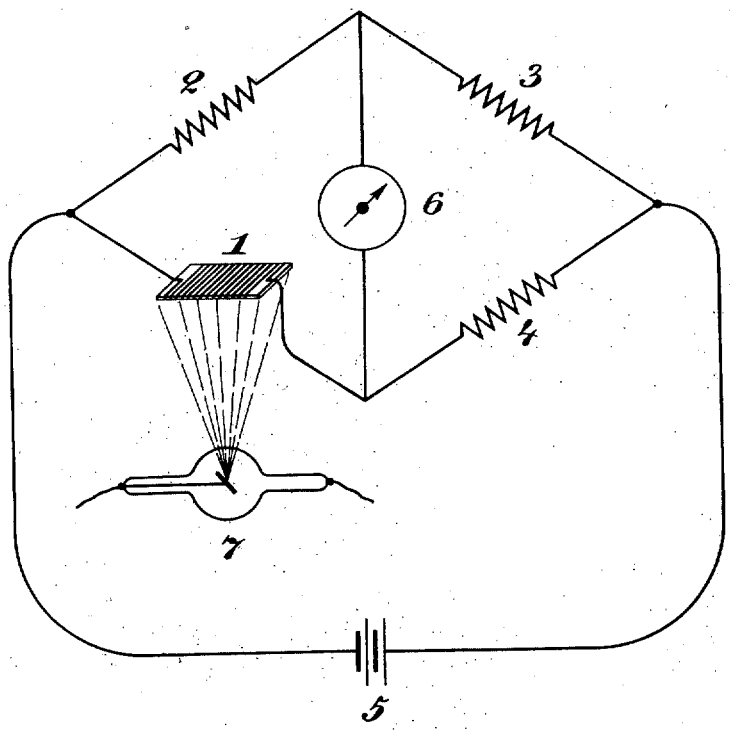

UNITED STATES PATENT OFFICE.

ROBERT FÜRSTENAU, OF BERLIN, GERMANY.

MEASURING INSTRUMENT FOR RÖNTGEN RAYS.

1,229,740.  Specification of Letters Patent.  Patented June 12, 1917.

Application filed January 28, 1914. Serial No. 814,980.

*To all whom it may concern:*

Be it known that I, ROBERT FÜRSTENAU, a resident of Berlin, Germany, a subject of the King of Prussia, and whose post-office address is 146 Kurfürstenstrasse, Berlin, Kingdom of Prussia, German Empire, have invented new and useful Improvements in or Relating to Measuring Instruments for Röntgen Rays, of which the following is a specification.

Crystalline selenium has the property of varying its electric resistance when subjected to the action of Röntgen rays. It is, however, very much less sensitive to Röntgen rays than to the rays of light so that relatively small resistance variations occur on applying rays of the intensity which is usual in practice.

Now this invention has for its object to provide a useful measuring instrument for Röntgen rays whereby all the inconveniences hitherto arising out of the use of a cell of selenium are avoided. The novel arrangement consists in the arrangement of the selenium cell in a branch of a Wheatstone bridge. The arrangement and the strength of the resistances are so calculated that when the selenium cell is not exposed to any rays a current flows through the galvanometer of the bridge in a direction which is opposite to that of the current flowing through the instrument when the cell is exposed to the rays. By means of this arrangement the great drawbacks which hitherto defeated the practical use of selenium cells for measuring Röntgen rays are entirely dispensed with. No injurious current and heat fluctuations occur in the selenium cell and the pointer of the measuring instrument returns to zero immediately the radiation ceases.

An arrangement of this kind is illustrated diagrammatically by way of example in the accompanying drawing.

1 is the selenium element which is subjected to the rays of the Röntgen tube 7. 2, 3 and 4 are the resistances in the branches of the bridge. 5 is the battery and 6 the galvanometer.

What I do claim as my invention, and desire to secure by Letters Patent of the United States, is:—

A Röntgen ray measuring instrument comprising in combination a Wheatstone bridge having a selenium cell for exposure to the rays in one of its two parallel resistance branches, and a galvanometer connected across from an intermediate point of one resistance branch to an intermediate point of the other resistance branch; the relative resistance of the branch containing the selenium cell being of a magnitude to cause the current to flow through the galvanometer in one direction when said cell is exposed to Röntgen rays and in the reverse direction when not exposed, whereby the indicator of said galvanometer is returned to its normal position immediately after discontinuing the exposure of the selenium cell to the rays.

In testimony whereof I have hereunto set my hand in presence of two subscribing witnesses.

ROBERT FÜRSTENAU.

Witnesses:
 WOLDEMAR HAUPT,
 HENRY HASPER.